United States Patent
Schumann

(10) Patent No.: US 10,162,055 B2
(45) Date of Patent: Dec. 25, 2018

(54) METHOD FOR OPERATING A SURROUNDINGS DETECTION SYSTEM OF A VEHICLE HAVING AT LEAST TWO TRANSCEIVER UNITS AND SURROUNDINGS DETECTION SYSTEM

(71) Applicant: Robert Bosch GmbH, Stuttgart (DE)

(72) Inventor: Michael Schumann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 599 days.

(21) Appl. No.: 13/949,485

(22) Filed: Jul. 24, 2013

(65) Prior Publication Data
US 2014/0029385 A1   Jan. 30, 2014

(30) Foreign Application Priority Data
Jul. 24, 2012   (DE) .................. 10 2012 212 894

(51) Int. Cl.
| | |
|---|---|
| G01S 15/00 | (2006.01) |
| G01S 15/93 | (2006.01) |
| G01S 15/42 | (2006.01) |
| G01S 15/87 | (2006.01) |
| G01S 15/46 | (2006.01) |

(52) U.S. Cl.
CPC ............ *G01S 15/931* (2013.01); *G01S 15/42* (2013.01); *G01S 15/87* (2013.01); *G01S 15/878* (2013.01); *G01S 2015/465* (2013.01)

(58) Field of Classification Search
CPC .................................................... G01S 5/186
See application file for complete search history.

(56) References Cited

U.S. PATENT DOCUMENTS

| | | | | |
|---|---|---|---|---|
| 4,675,853 A | * | 6/1987 | Bourgeois ............... | G01S 13/90 367/88 |
| 6,074,348 A | * | 6/2000 | Chiao et al. .................. | 600/443 |

(Continued)

FOREIGN PATENT DOCUMENTS

| | | |
|---|---|---|
| DE | 198 42 250 | 3/2000 |
| DE | 11 2004 02541 | 12/2006 |

(Continued)

*Primary Examiner* — Hovhannes Baghdasaryan
(74) *Attorney, Agent, or Firm* — Norton Rose Fulbright US LLP; Gerard Messina

(57) ABSTRACT

A method for operating a surroundings detection system of a vehicle having at least two transceiver units, at least one transceiver unit emitting signals, and the at least two transceiver units receiving echo signals of the emitted signals, the echo signals being reflected by reflection sources situated in a detection range of the transceiver units. It is provided that received wave pulses and corresponding amplitude information are ascertained from the received echo signals, and upon receipt of the received wave pulses originating from at least two different reflection sources, an assignment of different received wave pulses of a first transceiver unit to different received wave pulses of a second transceiver unit is performed, taking into account the amplitude information, so that a spatial position of the at least two different reflection sources is ascertainable. Also described is a surroundings detection system and a computer program configured for performing the method.

10 Claims, 3 Drawing Sheets

(56) References Cited

U.S. PATENT DOCUMENTS

| | | |
|---|---|---|
| 7,227,493 B2 | 6/2007 | Oswald et al. |
| 2003/0151541 A1* | 8/2003 | Oswald et al. ............... 342/70 |
| 2005/0054928 A1* | 3/2005 | Cerofolini .................. 600/443 |
| 2006/0082502 A1* | 4/2006 | Dooley ..................... 342/453 |
| 2008/0114241 A1* | 5/2008 | Randall et al. ............. 600/443 |

FOREIGN PATENT DOCUMENTS

| | | |
|---|---|---|
| DE | 10 2005 062 263 | 5/2007 |
| EP | 0326623 A1 | 8/1989 |
| EP | 1 105 749 | 6/2001 |
| GB | 2327266 A | 1/1999 |

* cited by examiner

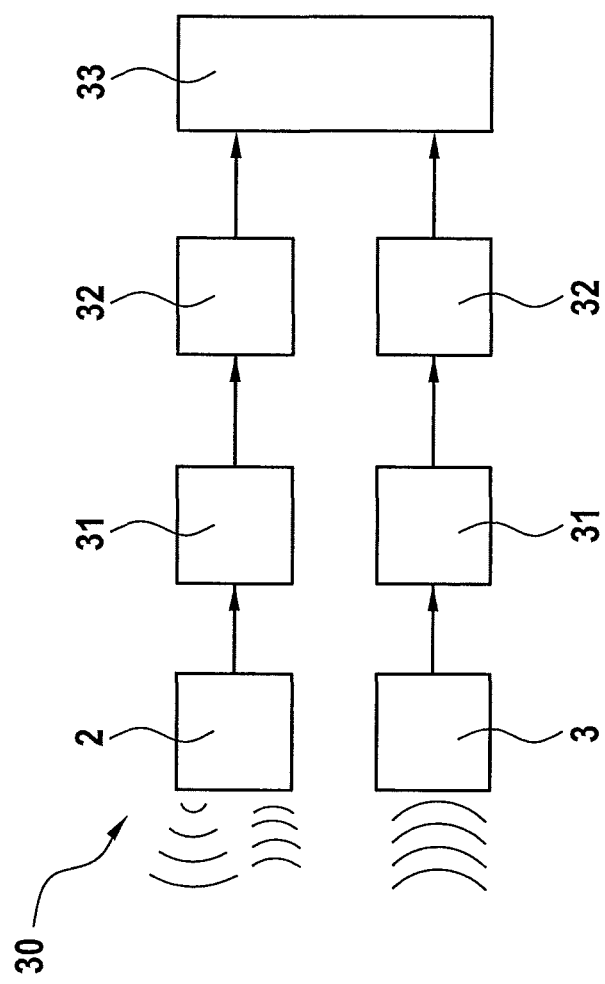

METHOD FOR OPERATING A SURROUNDINGS DETECTION SYSTEM OF A VEHICLE HAVING AT LEAST TWO TRANSCEIVER UNITS AND SURROUNDINGS DETECTION SYSTEM

RELATED APPLICATION INFORMATION

The present application claims priority to and the benefit of German patent application no. 10 2012 212 894.8, which was filed in Germany on Jul. 24, 2012, the disclosure of which is incorporated herein by reference.

FIELD OF THE INVENTION

The present invention relates to a method for operating a surroundings detection system of a motor vehicle having at least two transceiver units. The subject matter of the present invention is also to a surroundings detection system of a vehicle and a computer program, which are configured in particular for carrying out one of the methods described here.

BACKGROUND INFORMATION

German patent document DE 10 2005 062 263 A1 discusses a method and a device for detecting objects in the immediate surroundings of a vehicle, in which the objects are detected by multiple distance sensors. A so-called signal collision occurs when one sensor detects a signal emitted by another sensor, so that the propagation time of the ultrasonic signal is calculated incorrectly, resulting in an erroneous distance measurement. To prevent the signal collision, it is provided that the detected signals are to be filtered as a function of the propagation time. The distance sensors detect only signals within a relatively narrow time window. In addition to that, a signal coding may take place with the aid of a signal pulse width modulation or an amplitude modulation. Specifying a relatively narrow time window entails safety risks, namely that signals are not detected, despite having been reflected. This risk is not remedied by specifying the modulation.

Patent document EP 1 105 749 B1 discusses a method and a device for detecting objects, in particular as a parking assistance device in a motor vehicle, misidentification of obstacles in the event that two or multiple transducers on a vehicle are transmitting at the same time being avoided by the fact that the distance sensors receive a chronologically variable identifier, so that the received signals may be assigned to sources reliably and unambiguously.

SUMMARY OF THE INVENTION

In the method according to the present invention for operating a surroundings detection system of a vehicle having at least two transceiver units, at least one transceiver unit emitting wave pulses, and the at least two transceiver units receiving echo signals of the emitted wave pulses, which are reflected by reflection sources which are situated in a detection range of the transceiver unit, it is provided that received wave pulses and corresponding amplitude information are ascertained from the received echo signals, and upon receipt of received wave pulses which originate from at least two different reflection sources an assignment of different received wave pulses of a first transceiver unit to different received wave pulses of a second transceiver unit is carried out, taking into account the amplitude information, so that a spatial position of the at least two reflection sources is ascertainable.

This method is based on an analysis of reflection properties of the reflection sources, which are detectable in the amplitude of the received echo signals, i.e., in the received wave pulses. Taking into account the reflection properties of the reflection sources, the assignment of different received wave pulses of the first transceiver unit to different received wave pulses of the second transceiver unit may take place. It is advantageous in particular that conclusions about the spatial position of reflection sources detected by the transceiver units may be drawn from this information. The method according to the present invention has the advantage that ambiguities in the detection of objects in the surroundings of a vehicle are avoidable in this way.

It is directly apparent that even in receiving received wave pulses which originate from a single reflection source, the received wave pulse of a first transceiver unit may be assigned to the received wave pulse of a second transceiver unit, taking into account the amplitude information, if the at least two transceiver units receive echo signals of the emitted wave pulses. The analysis of the amplitude information may be used for a plausibility check of the received wave pulses, for example, by ascertaining a significance or a probability value for a received wave pulse actually being a signal of a reflection source. The information about the received wave pulse may be transmitted to the driver by visualization, for example.

Surroundings detection systems are used to measure a distance from an object situated ahead of a transceiver unit, for example. The transceiver units used are generally based on a pulse echo method. In this operation, the transceiver unit emits a wave pulse and measures the reflection of the wave pulse created by an object, namely the echo signal, in other words, the received wave pulse or simply the echo peak.

Amplitude information in particular advantageously includes an echo strength of a signal, i.e., the strength of an echo signal is ascertained as amplitude information from the received echo signals. An object having a great reflectivity causes the receiving units participating in the measurement to measure a high echo amplitude. An object having a low reflectivity causes the receiving units participating in the measurement to measure a low echo amplitude. If objects of different reflectivity are in the observation field, then a plausibility check may take place with the goal of eliminating implausible echo combinations from the calculation.

The echo strength may be expressed, for example, by an area content of a pulse, as a position of a maximum in the received wave pulse from a ratio of a maximum to an area or from a combination thereof. According to a particularly simple criterion, the identity of the reflection source on which the amplitude is based may be inferred from an equal or a similar amplitude. As an alternative to this or in addition, it may be provided for a signal distortion in the signal to be determined which has been caused by reflection properties of the reflection source.

According to one specific embodiment, the method includes the following steps:
a) ascertaining at least two different received wave pulses in the corresponding input signal of the transceiver units,
b) ascertaining the amplitude information of the received wave pulses,
step b) being carried out if in step a) at least two different received wave pulses have been ascertained in the corresponding input signal of the transceiver units. In this specific embodiment, it may be achieved that the received echo signal is not analyzed continuously for amplitude information from presumed reflection sources situated in the surroundings of the vehicle but instead is analyzed only when an ambiguity in the received echo signal has been detected. It may thus be achieved that the computing volume is reduced substantially, in particular with digital signal processing.

It is clear that different reflection sources need not, but may be, different objects. They may also represent two reflection centers of a single object. If there are still other reflection sources in the field of vision of the transceiver unit, then the number of received signals increases accordingly. The present invention may also be applied to these more complex situations within the scope of expert action by using suitable analysis programs which carry out a mathematical analysis of the echo signals of the individual transceiver units.

Signal propagation times may be ascertained and distances of the transceiver units from the reflection sources are ascertained from them. The distance between the sensor and the object is calculated based on the measured echo propagation time and the velocity of sound. In addition to the distance, the angle information about the objects is important, so that the object may be localized in space. To extract the angle information, for example, multiple sensor elements may be combined into one system and the propagation time differences from the reflected signal to the sensors may be utilized. This procedure is also known as trilateration. If there is only one object in the field of vision of the sensors, then accurate localization of the position of the object is possible with the aid of trilateration.

In ascertaining the amplitude information according to a specific embodiment of the present invention, an influence of signal propagation times is taken into account. In particular an expected decline in signal strength may be ascertained to improve the assignment of the reflection sources in the echo signals of the at least two transceiver units. In cases when there are large opening angles with respect to a main axis of the transceiver units in particular, it is advantageous to also include the decline in signal strengths due to the different propagation paths and due to the directional characteristic of the sensors in the plausibility consideration. Since these variables are known, they may be included in the calculation.

This method may be used in static or dynamic scenes. This method may be used advantageously in static scenes in particular. With a stationary vehicle and static objects, it is generally impossible to resolve the ambiguities which arise when multiple reflection sources are situated in the detection region of the transceiver units. This results in ghost objects, which may result in a false alarm or an incorrect display of the surroundings. This method may be used advantageously even in quasi static scenes, i.e., when the vehicle and/or the object moved toward one another at a very low speed or at a very low relative speed.

According to the present invention, a computer program is furthermore proposed according to which one of the methods described herein is carried out when the computer program is executed on a programmable computer device. The computer program may be, for example, a module for implementation of a driver assistance system or a subsystem thereof in a vehicle or an application for driver assistance functions which are executable on a smartphone. The computer program may be stored in a machine-readable memory medium, for example, on a permanent or rewritable memory medium or in assignment to a computer device or on a removable CD-ROM, DVD or USB stick. Additionally or alternatively, the computer program may be furnished, for example, on a server for downloading, e.g., via a data network such as the Internet or a communication link such as a telephone line or a wireless connection.

According to another aspect of the present invention, a surroundings detection system of a vehicle having at least two transceiver units, at least one transceiver unit being configured to emit wave pulses and the at least two transceiver units being configured to receive echo signals of the emitted wave pulses, the echo signals being reflected by reflection sources which are situated in a detection range of the transceiver units, includes at least one evaluation unit which is configured to ascertain from the received echo signals received wave pulses and corresponding amplitude information, and an assignment unit which is configured to carry out an assignment of different received wave pulses of a first transceiver unit to different received wave pulses of a second transceiver unit upon receipt of received wave pulses which originate from at least two different reflection sources, taking into account the amplitude information, so that a spatial position of the at least two reflection sources is ascertainable.

The surroundings detection system has at least one transceiver unit, the transceiver unit also optionally being, within the scope of the present invention, a transmitting unit, a receiving unit or, as generally, a sending and receiving unit.

The system may be used particularly advantageously with surroundings detection systems, in which a piece of amplitude information is already transmitted to an evaluation unit, which ascertains distances of the corresponding transceiver unit from the reflection sources by taking into account the received echo signals. In this respect no retrofitting is necessary for this purpose under some circumstances.

According to one specific embodiment, the surroundings detection system has a speed ascertaining unit which is configured to ascertain the speed of the host vehicle, thereby permitting detection of static scenes.

The transceiver units may be ultrasonic transceiver units. An ultrasonic system according to the present invention may include a group of ultrasonic sensors, which jointly detect a portion of the surroundings of the vehicle; for example, the ultrasonic sensors in the front area for detecting a front vehicle surroundings and/or the ultrasonic sensors in the side area for detecting a side area of the vehicle and/or the ultrasonic sensors in the rear for detecting the rear surroundings of the vehicle may each be assigned to an ultrasonic system. Four to six sensors may be installed in a bumper, usually only four sensors at most having approximately the same viewing direction being installed. In particular to also detect the area alongside the vehicle, sensors which also have a detection range to the left and to the right are also positioned in the front bumper. Additionally or alternatively, sensors may also be positioned in the rear bumper, in such a way that they detect an area to the right and left alongside the vehicle. The ultrasonic system may also include a control unit assigned to the corresponding group and a signal processing unit.

Exemplary embodiments of the present invention are depicted in the drawings and explained in greater detail in the following description.

BRIEF DESCRIPTION OF THE DRAWINGS

FIG. 3 shows a schematic diagram of a surroundings detection system of a vehicle.

DETAILED DESCRIPTION

Figure 1:
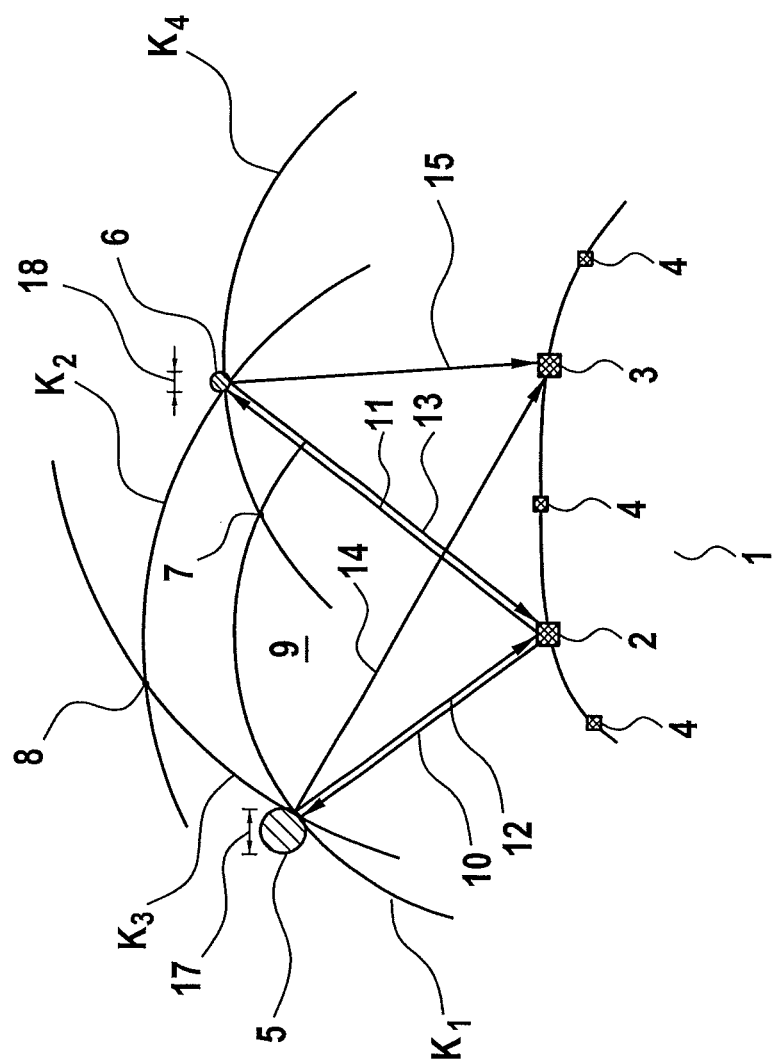
FIG. 1 shows a situation involving a vehicle and two reflection sources ahead of it.

FIG. 1 shows a situation involving a vehicle 1 having multiple transceiver units 2, 3, 4 and reflection sources 5, 6 situated ahead of the vehicle. In addition, two ghost objects 7, 8 are shown, these ghost objects having been detected due to false evaluations of a surroundings detection system of vehicle 1. Two reflection sources 5, 6 and ghost objects 7, 8 are situated within a detection range 9 of at least two transceiver units 2, 3.

Transceiver units 2, 3, 4 are generally operated in parallel operation or in sequential operation, so that each transceiver unit 2, 3, 4 is used as a transmitting unit and as a receiving unit at certain points in time. Transmitters and receivers, which only transmit or receive, respectively, may of course also be provided.

For example, first transceiver unit 2 is active as a transmitter unit. A signal transmitted from first transceiver unit 2 goes to first reflection source 5, which is represented as an arrow, for example. The signal going to second reflection source 6 is represented as another arrow. In other words, the transmitted signal contains a first component 10, which reaches first reflection source 5 and a second component 11, which reaches second reflection source 6.

A first echo signal, also known as a first direct echo 12, goes from first reflection source 5 back to first transceiver unit 2. In other words, the signal reflected by first reflection source 5 contains a first component 12, which goes back to first transceiver unit 2. A second echo signal goes from first reflection source 5 back to second transceiver unit 3. The second echo signal is also referred to as first cross echo 14. In other words, the signal reflected by first reflection source 5 contains a second component 14, which reaches second transceiver unit 3.

A first echo signal, also referred to as second direct echo 13, goes from second reflection source 6 back to first transceiver unit 2. In other words, the echo signal emitted by second reflection source 6 has a first component 13, which goes back to first transceiver unit 2. Furthermore, a second echo signal, which is also referred to as second cross echo 15, goes from second reflection source 6 back to second transceiver unit 3. In other words, the signal reflected by second reflection source 6 also contains a second component 15, which reaches second transceiver unit 3.

Each transceiver unit 2 measures two echo signals induced by the two reflection sources 5, 6. If there are different propagation paths, transceiver units 2, 3 detect each echo signal at different times. In the exemplary embodiment shown here, it should be assumed that first transceiver unit 2 measures second direct echo 13 first and then measures first direct echo 12 after it. In the exemplary embodiment shown here, it should also be assumed that second transceiver unit 3 measures first cross echo 14 first and then measures second cross echo 15 after it.

The signal propagation time of first component 10 of the transmitted signal and of first direct echo 12 is equal to twice the actual distance of first reflection source 5 from first transceiver unit 2. The possible positions of first reflection source 5 predefined by this distance are illustrated by a first circle $K_1$.

Likewise, a second circle $K_2$ with the possible positions of second signal reflection source 6 from first transceiver unit 2 may be determined from half the sum of the signal propagation times of second component 11 of the transmitted signal and of second direct echo 13.

For the distance determination of first reflection source 5 from second transceiver unit 2, the fact is used that the distance is the sum of the signal propagation times of first component 10 of the transmitted signal and of the first cross echo 14. In this way, a third circle $K_3$ with the possible positions of first reflection source 5 with respect to second transceiver unit 3 may be defined. Furthermore, a fourth circle $K_4$ with the possible positions of second reflection source 6 with respect to second transceiver unit 3 may be determined from the sum of the signal propagation times of second component 11 of the transmitted signal and of second cross echo 15.

Due to the presence of two direct echoes 12, 13 of first transceiver unit 2 and two cross echoes 14, 15 of second transceiver unit 3, there are two calculable possible positions for first reflection source 5, namely a first point of intersection of first circle $K_1$ with third circle $K_3$ and a second point of intersection of first circle $K_1$ with fourth circle $K_4$. The wrong combination of the echoes results in first ghost object 7. Likewise there are two possible points of intersection in the assignment of circles $K_2$ and $K_3$ or $K_4$ to one another. On the one hand, these result in the actual location of second reflection source 6 and the location of second ghost object 8. In static scenes in particular, it is impossible to differentiate between ghost objects 7, 8 and real objects 5, 6.

The number of possible coordinates increases accordingly if there are still other objects in the field of vision of the sensors. For the sake of simplicity, this depiction relates only to two reflection sources but may also be transferred accordingly.

Two reflection sources 5, 6 shown here have different reflectivities. As an example, first reflection source 5 is represented as a tube having a large diameter 17. Second reflection source 6 is represented as a tube having a small diameter 18. The tube having large diameter 17 achieves a higher reflection than the tube having small diameter 18.

Figure 2:
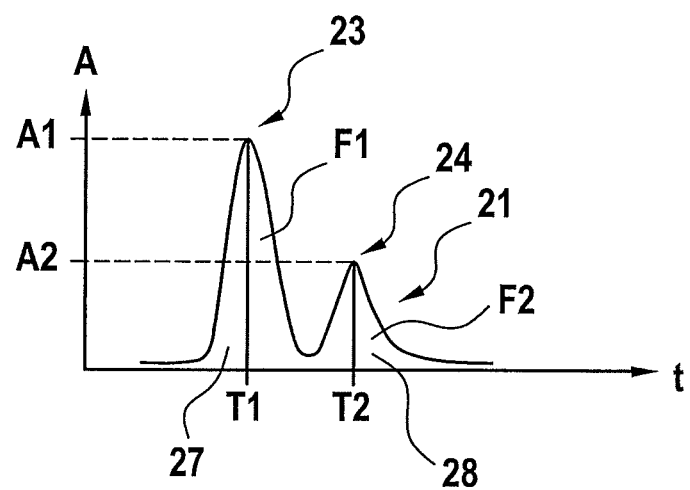
FIG. 2 shows signal characteristic curves of two transceiver units.
Figure 2:
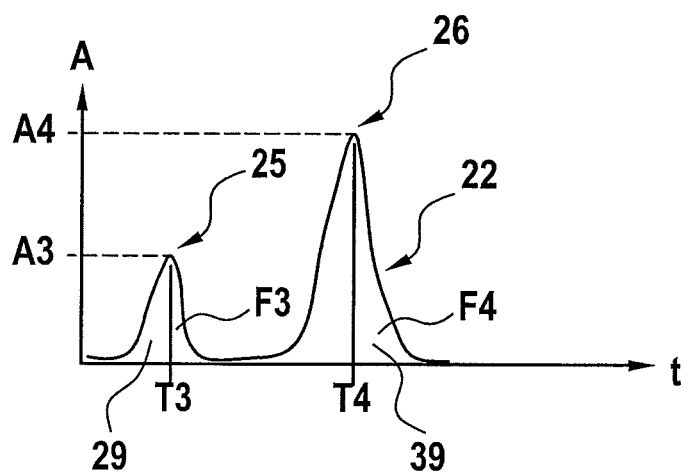

FIG. 2 shows two signal curves 21, 22 of received signals of transceiver units 2 and 3, shown as examples in an amplitude-over-time diagram in FIG. 1. A first signal curve 21 may be assigned to first transceiver unit 2, for example. Signal curve 21 shows a first received wave pulse 27 having a first pulse peak 23 at a first time T1 and a second received wave pulse 28 having a second pulse peak 24 at a second time T2, second time T2 being greater than first time T1. First pulse peak 23 at first point in time T1 has a higher amplitude A1 than second pulse peak 24 at second point in time T2, whose amplitude is A2. The entire situation is reversed with second transceiver unit 3. A first received wave pulse 29 measured at an earlier point in time T3 and having a first pulse peak 25 has a lower amplitude A3 than a second received wave pulse 39 having a second pulse peak 26 having an amplitude A4 measured at a later point in time T4. As described with reference to FIG. 1, the possible position of reflection sources 5, 6 and ghost objects 7, 8 may be determined from points in time T1, T2, T3, T4.

Different amplitudes A1, A2, A3, A4 of the peaks or pulse peaks 23, 24, 25, 26 are due to the different reflectivities of the first and second reflection sources shown in FIG. 1. Thus an assignment of first received wave pulse 27 to second received wave pulse 39 of second transceiver unit 3 from first signal curve 21 of first transceiver unit 2 may take place by interpreting the signal curves by measuring amplitudes A1, A2, A3, A4 in particular. Likewise, second received wave pulse 28 of first transceiver unit 2 may be assigned to first received wave pulse 29 of second transceiver unit 3.

The amplitude information may be an equal or a similar amplitude, for example, A1 and A4 here or A2 and A3 of pulse peaks 23, 24, 25, 26, so that the identity of the reflection source on which the amplitude is based may be inferred. The amplitude information may also be an area content F1, F2, F3, F4 of a received wave pulse 27, 28, 29, 39, a relative position of pulse peak 23, 24, 25, 26 in received wave pulse 27, 28, 29, 39, a ratio of amplitude A1, A2, A3, A4 to area content F1, F2, F3, F4 of received wave pulse 27, 28, 29, 39 or from a combination thereof. Alternatively or additionally, it may be provided to determine an additional signal distortion which has been caused by reflection properties of the reflection sources.

FIG. 3 shows a schematic diagram of a surroundings detection system 30 according to the present invention. A first transceiver unit 2 is configured to emit signals and receive echo signals of the emitted signals. A second transceiver unit 3 is at least configured to receive echo signals. Second transceiver unit 3 may of course also be configured to emit signals.

The received echo signals in general contain useful signal components and interference signal components and each passes through filter devices 31, in particular to determine the useful signal components from the echo signals. The received signals are processed in filter device 31, for example, being amplified, digitized, sampled, low-pass-filtered, high-pass-filtered or band-pass-filtered and/or freed of interfering signals. A received echo signal is also referred to as a processed received signal after having passed through filter devices 31.

The processed received signals are then supplied, for example, to computer-implemented evaluation units 32, which are able to ascertain distances of corresponding transceiver units 2, 3 from reflection sources situated in the detection range, taking into account the received echo signals. Furthermore, amplitude information, for example, the position and number of pulse peaks, the height of the pulse peaks and/or the shape of the pulse peaks may also be ascertained in evaluation units 32, as described previously.

An assignment unit 33, which is also computer implemented, for example, processes the information supplied by evaluation unit 32 and carries out an assignment of the reflection sources in the echo signals of at least two transceiver units 2, 3 to one another, taking into account the amplitude information.

Assignment unit 33 supplies signals and/or data for additional control units of driver assistance systems, for example, for parking assistants, back-over avoidance systems, adaptive cruise control systems (ACC systems), systems for accident prevention or accident damage reduction.

The present invention is not limited to the exemplary embodiments described here and the aspects emphasized therein. Instead, a variety of modifications which are within the scope of expert actions are possible within the range defined by the claims.

What is claimed is:

1. A method for operating a surroundings detection system of a vehicle having at least two transceiver units, the method comprising:
    transmitting, by a first transceiver unit of the at least two transceiver units, a first signal, the first signal being reflected by a first reflection source to the first transceiver unit as a first direct echo signal, and being reflected by the first reflection source to a second transceiver of the at least two transceivers as a first cross echo signal, the first signal further being reflected by a second reflection source to the first transceiver as a first direct echo signal, and being reflected by the second reflection source to the second transceiver unit as a second cross echo signal, wherein the first reflection source and the second reflection source are situated in a detection range of the at least two transceivers;
    receiving, by the first transceiver unit, the first direct echo signal and the second direct echo signal;
    receiving, by the second transceiver unit, the first cross echo signal and the second cross echo signal;
    determining propagation times of the first signal, the first direct echo signal, the second direct echo signal, the first cross echo signal and the second cross echo signal;
    determining distances of each of the first and second reflection sources to each of the first transceiver unit and the second transceiver unit using the determined propagation times;
    ascertaining received wave pulses of the first transceiver unit and corresponding amplitude information from the received first direct echo signal and the received second direct echo signal;
    ascertaining received wave pulses of the second transceiver unit and corresponding amplitude information from the received first cross echo signal and the received second cross echo signal;
    comparing the amplitude information of the received wave pulses of the first transceiver unit to the amplitude information of the received wave pulses of the second transceiver unit;
    assigning the received wave pulses of the first transceiver unit to the received wave pulses of the second transceiver unit based on results of the comparison; and
    determining a spatial position of at least one of the first reflection source and the second reflection source, based on the determined distances and based on the assignment.

2. The method of claim 1, wherein the amplitude information of the wave pulses of the first transceiver unit and the amplitude information of the wave pluses of the second transceiver unit includes an echo strength.

3. The method of claim 1, wherein the method is used in static scenes or dynamic scenes.

4. The surroundings detection system of claim 1, wherein the transceiver units include ultrasonic transceiver units.

5. The surroundings detection system of claim 1, wherein the surroundings detection system includes a speed ascertaining unit.

6. The method as recited in claim 1, wherein in the ascertaining of the amplitude information of the received wave pulses of the first transceiver unit and the amplitude information of the received wave pulses of the second transceiver unit, the signal propagation times are taken into account.

7. The method as recited in claim 1, wherein the amplitude information of the received wave pulses of the first transceiver unit and the amplitude information of the received wave pulses of the second transceiver unit includes amplitudes of peak pulses in the received wave pulses of the first transceiver unit and the received wave pulses of the second transceiver unit.

8. The method as recited in claim 1, wherein the amplitude information of the received wave pulses of the first transceiver unit and the amplitude information of the received wave pulses of the second transceiver unit includes area content of the received wave pulses of the first transceiver unit and the received wave pulses of the second transceiver unit.

9. A computer readable medium having a computer program, which is executable by a processor, comprising:
   a program code arrangement having program code for operating a surroundings detection system of a vehicle having at least two transceiver units, by performing the following:
   transmitting, by a first transceiver unit of the at least two transceiver units, a first signal, the first signal being reflected by a first reflection source to the first transceiver unit as a first direct echo signal, and being reflected by the first reflection source to a second transceiver of the at least two transceivers as a first cross echo signal, the first signal further being reflected by a second reflection source to the first transceiver as a first direct echo signal, and being reflected by the second reflection source to the second transceiver unit as a second cross echo signal, wherein the first reflection source and the second reflection source are situated in a detection range of the at least two transceivers;
   receiving, by the first transceiver unit, the first direct echo signal and the second direct echo signal;
   receiving, by the second transceiver unit, the first cross echo signal and the second cross echo signal;
   determining propagation times of the first signal, the first direct echo signal, the second direct echo signal, the first cross echo signal and the second cross echo signal;
   determining distances of each of the first and second reflection sources to each of the first transceiver unit and the second transceiver unit using the determined propagation times;
   ascertaining received wave pulses of the first transceiver unit and corresponding amplitude information from the received first direct echo signal and the received second direct echo signal;
   ascertaining received wave pulses of the second transceiver unit and corresponding amplitude information from the received first cross echo signal and the received second cross echo signal;
   comparing the amplitude information of the received wave pulses of the first transceiver unit to the amplitude information of the received wave pulses of the second transceiver unit;
   assigning the received wave pulses of the first transceiver unit to the received wave pulses of the second transceiver unit based on results of the comparison; and
   determining a spatial position of at least one of the first reflection source and the second reflection source, based on the determined distances and based on the assignment.

10. A surroundings detection system of a vehicle, comprising:
   at least two transceiver units, a first transceiver unit of the at least two transceiver units being configured to transmit a first signal, the first signal being reflected by a first reflection source to the first transceiver unit as a first direct echo signal, and being reflected by the first reflection source to a second transceiver of the at least two transceivers as a first cross echo signal, the first signal further being reflected by a second reflection source to the first transceiver as a first direct echo signal, and being reflected by the second reflection source to the second transceiver unit as a second cross echo signal, wherein the first reflection source and the second reflection source are situated in a detection range of the at least two transceivers, the first transceiver configured to receive the first direct echo signal and the second direct echo signal, and the second transceiver configured to receive the first cross echo signal and the second cross echo signal;
   at least one evaluation unit configured to determine propagation times of the first signal, the first direct echo signal, the second direct echo signal, the first cross echo signal and the second cross echo signal, determine distances of each of the first and second reflection sources to each of the first transceiver unit and the second transceiver unit using the determined propagation times, ascertain received wave pulses of the first transceiver unit and corresponding amplitude information from the received first direct echo signal and the received second direct echo signal, and ascertain received wave pulses of the second transceiver unit and corresponding amplitude information from the received first cross echo signal and the received second cross echo signal; and
   an assignment unit configured to compare the amplitude information of the received wave pulses of the first transceiver unit to the amplitude information of the received wave pulses of the second transceiver unit, and assign the received wave pulses of the first transceiver unit to the received wave pulses of the second transceiver unit based on the results of the comparison;
   wherein the surroundings detection system determines a spatial position of at least one of the first reflection source and the second reflection source, based on the determined distances and based on the assignment.

* * * * *